United States Patent Office 3,134,782
Patented May 26, 1964

3,134,782
3-(MONOCARBOCYCLIC ARYL)-3-(MONOCAR-BOCYCLIC ARYLHYDROXYMETHYL)TRO-PANES AND PREPARATION THEREOF
Sydney Archer, Bethlehem, and Malcolm R. Bell, North Greenbush, N.Y., assignors to Sterling Drug Inc., New York, N.Y., a corporation of Delaware
No Drawing. Original application Apr. 30, 1958, Ser. No. 731,857, now Patent No. 3,120,537, dated Feb. 4, 1964. Divided and this application Nov. 23, 1959, Ser. No. 860,061
4 Claims. (Cl. 260—292)

The invention here resides in the concept of compositions of matter having a molecular structure in which a carboxy group and a monocarbocyclic aryl group are separately attached to the 3-position ring carbon atom of a tropane nucleus; and, in processes for physically embodying such concept including the chemical intermediates of the sequence of operations leading to the said final product.

A particular aspect of the invention relates to compounds having the formula

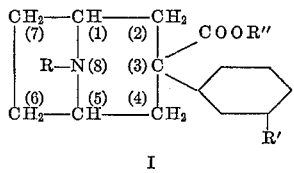

I wherein R represents hydrogen, a lower-aliphatic hydrocarbon, monocarbocyclic aryl substituted lower-aliphatic hydrocarbon, or a monocarbocyclic arylamino substituted lower-aliphatic hydrocarbon radical, R' represents hydrogen, a lower-alkoxy radical, the hydroxy radical or a carboxylic acyloxy radical, and R" represents a lower-alkyl radical.

In the above general formula I, R represents a hydrogen atom or a substituent selected from lower-aliphatic hydrocarbon, monocarbocyclic aryl substituted lower-aliphatic hydrocarbon, and monocarbocyclic arylamino substituted lower-aliphatic hydrocarbon radicals. When R stands for a lower-aliphatic hydrocarbon radical it represents saturated or unsaturated radicals, i.e., lower-alkyl, lower-alkenyl, or lower-alkynyl having from one to about eight carbon atoms, such as methyl, ethyl, propyl, isopropyl, butyl, tertiary-butyl, hexyl, octyl, vinyl, 1-propenyl, 2-propenyl (allyl), 2-butenyl, ethynyl, propargyl, and the like.

When R represents a monocarbocyclic aryl substituted lower-aliphatic hydrocarbon radical, it stands for the same type of lower-aliphatic radicals as described above substituted by a phenyl radical or a phenyl radical having one or more substituents such as hydroxy, fluoro, chloro, bromo, iodo, nitro, amino, lower-alkoxy, lower-alkylamino or lower-carboxylic acylamino. A preferred class of monocarbocyclic aryl radicals comprises phenyl and phenyl substituted by from one to three substituents selected from hydroxy, fluoro, chloro, bromo, iodo, nitro, amino, lower-alkoxy, lower-alkylamino and lower-carboxylic acylamino. Thus, R can represent such groups as benzyl, 2-phenylethyl, 3-phenylpropyl, cinnamyl, p-aminophenethyl, p-methoxyphenethyl, p-chlorophenethyl, 3,4,5-trimethoxyphenyl, and the like.

When R represents a monocarbocyclic arylamino substituted lower-aliphatic hydrocarbon radical, the monocarbocyclic aryl and lower-hydrocarbon moieties have the same meanings as given above, but are separated by an imino grouping, —NH—, and R in this instance represents such groups as 2-phenylaminoethyl, 3-phenylamino-propyl, 3-phenylamino-2-propenyl, 2-(p-aminophenylamino)ethyl, and the like.

In the above general formula I, R' represents a hydrogen atom or a lower-alkoxy, hydroxy or carboxylic acyloxy radical. The lower-alkoxy radicals have preferably from one to about four carbon atoms, thus including such radicals as methoxy, ethoxy, propoxy, isopropoxy, butoxy, and the like. The carboxylic acyloxy radicals are preferably derived from carboxylic acids having from one to about ten carbon atoms, and having a molecular weight less than about 250. Representative of the acyl radicals which can be present are lower-alkanoyl radicals, e.g., formyl, acetyl, propionyl, butyryl, isobutyryl, caproyl, heptanoyl, octanoyl, decanoyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; and monocarbocyclic aryl-lower-alkanoyl or -alkenoyl radicals, such as phenylacetyl, β-phenylpropionyl, cinnamoyl, and the like.

In the above general formula I, R" represents a hydrogen atom or a lower-alkyl radical, the latter having preferably from one to about six carbon atoms, thus including such radicals as methyl, ethyl, propyl, isopropyl, butyl, isobutyl, pentyl, hexyl, and the like.

The preparation of the compounds of the invention is delineated by the following flow-sheet:

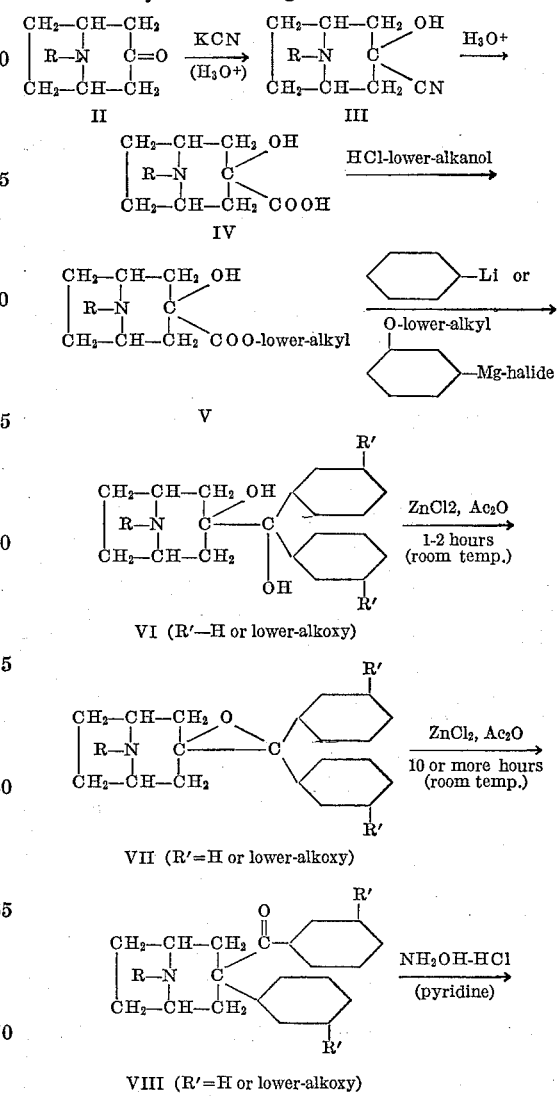

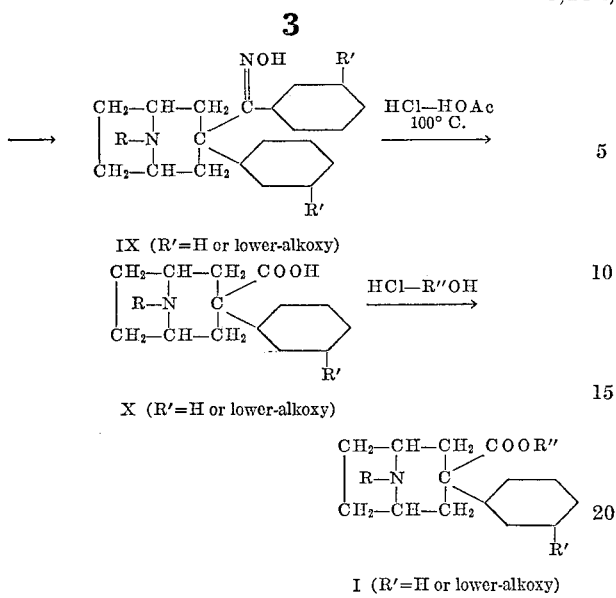

IX (R'=H or lower-alkoxy)

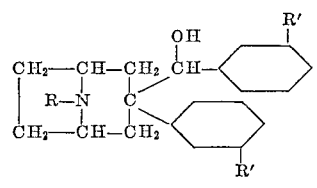

X (R'=H or lower-alkoxy)

CH₂—CH—CH₂  COOR''
| R—N    C  |
CH₂—CH—CH₂     ⟨⟩
                   R'

I (R'=H or lower-alkoxy)

An 8-R-nortropan-3-one (II) is treated with hydrogen cyanide to give the cyanohydrin, 3-hydroxy-3-cyano-8-R-nortropane (III). The latter is hydrolyzed in acid medium to the corresponding carboxylic acid, 3-hydroxy-3-carboxy-8-R-nortropane (IV). The acid (IV) is esterified with a lower-alkanol under acid conditions to the lower alkyl ester, 3-hydroxy-3-carbo-lower-alkoxy-8-R-nortropane (V).

The hydroxy ester (V) is subjected to reaction with phenyllithium or a monocarbocyclic arylmagnesium halide, e.g., phenylmagnesium halide, or a 3-lower-alkoxy derivative thereof, and the intermediate organometallic complex is hydrolyzed to produce a 3-hydroxy-3-[bis-(monocarbocyclic aryl)hydroxymethyl] - 8-R-nortropane (VI). The reaction is carried out under anhydrous conditions in an inert solvent such as ether, benzene, toluene or the like, and takes place at room temperatures, although gentle heating may be applied if desired to accelerate the reaction.

The glycol (VI) when treated at room temperature with zinc chloride and acetic anhydride first dehydrates to give an epoxide of a 3-bis(monocarbocyclic aryl) methylene-8-R-nortropane (VII) and then rearranges to a 3-(monocarbocyclic aryl)-3-(monocarbocyclic aroyl)-8-R-nortropane (VIII). The epoxide (VII) can be isolated if the reaction mixture is worked up after about one to two hours, whereas rearrangement to the ketone (VIII) is essentially complete if the reaction mixture is allowed to stand for at least about ten hours before working up.

The next step is the conversion of the ketone (VIII) to its oxime, a 3-(monocarbocyclic aryl)-3-(α-isonitroso-mono-carbocyclic arylmethyl) - 8 -R - nortropane (IX) which is accomplished by heating the ketone with an acid-addition salt of hydroxylamine in the presence of a base. Preferred bases are weak organic bases such as pyridine and the reaction is carried out in an inert solvent such as ethanol, at a temperature between aobut 50° C. and 150° C., in which case the oxime is obtained directly in the form of its acid-addition salt.

The conversion of the oxime (IX) to a 3-(monocarbocyclic aryl)-3-carboxy-8-R-nortropane (X) is effected by heating a solution of the oxime in acetic acid saturated with dry hydrogen chloride at a temperature between about 50° C. and 150° C. The transformation involves a Beckmann rearrangement followed by cleavage of the intermediate anilide having the grouping —CONHC₆H₄R' in the 3-position, as confirmed by the isolation of aniline from the reaction mixture in the case where R' is H.

The final step is an esterification of the acid (X) by treating it with a lower-alkanol in the presence of a strong acid, giving a 3-(monocarbocyclic aryl)-3-(carbo-lower-alkoxy)-8-R-nortropane (I). The esterification takes place at room temperature or above.

The ketones of formula VIII can be reduced catalytically or with lithium aluminum hydride to produce the corresponding hydroxy compounds, 3-(monocarbocyclic aryl)-3-(monocarbocyclic aryl-hydroxmethyl)-8-R-nortropanes (XI)

CH₂—CH—CH₂  CH—⟨⟩
| R—N    C      OH     R'
CH₂—CH—CH₂     ⟨⟩
                   R'

XI

The compounds of Formula XI in the form of their acid-addition or quaternary ammonium salts are useful as anticholinergic agents.

An alternative approach to the compounds of the invention of Formula I is set forth in the following flow-sheet (R''' represents a lower-alkyl radical and R has the meaning given above):

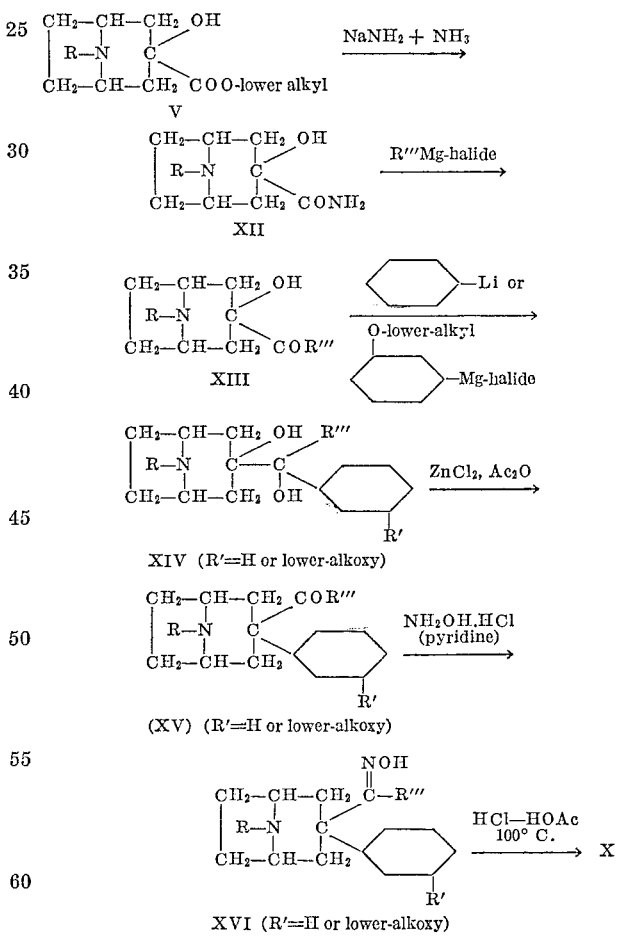

A 3-hydroxy-3-carbo-lower-alkoxy-8-R-nortropane of structure V is converted to the corresponding amide, 3-hydroxy-3-carbamyl-8-R-nortropane (XII), by treating with sodium amide in liquid ammonia. The amide XII is then subjected to a Grignard reaction with a lower-alkylmagnesium halide, the reaction stopping readily at the ketone stage to give a 3-hydroxy-3-lower-alkanoyl-8-R-nortropane (XIII). The latter is then subjected to a second Grignard reaction with phenyllithium, phenylmagnesium halide or a 3-lower-alkoxyphenylmagnesium halide to produce a 3-hydroxy-3-[lower-alkyl(monocarbocyclic aryl)hydroxymethyl]-8-R-nortropane (XIV). The structure XIV belongs to the same class of compounds as structure VI and they can be represented by a single formula as follows:

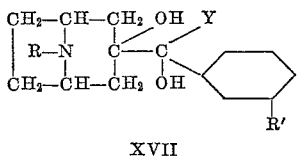

XVII wherein R' represents hydrogen or a lower-alkoxy radical, Y represents a lower-alkyl or 3-R'-phenyl radical, and R has the same meaning as given above.

The diol XIV is then converted to the desired 3-(monocarbocyclic aryl)-3-lower-alkanoyl-8-R-nortropane (XV) by treatment with zinc chloride and acetic anhydride at room temperature for ten or more hours, analogously to the conversion of VI (or VII) to VIII. The structure XV belongs to the same class of compounds as structure VIII and they can be represented by a single formula as follows:

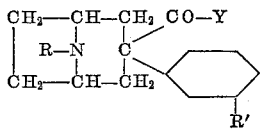

XVIII wherein R' represents hydrogen or a lower-alkoxy radical, Y represents a lower-alkyl or 3-R'-phenyl radical and R has the same meaning as given above.

The ketone XV is then converted to its oxime, a 3-(monocarbocyclic aryl)-3-(1-isonitroso-lower-alkyl)-8-R-nortropane (XVI), by treatment with hydroxylamine, analogously to the conversion of VIII to IX. The structure XVI belongs to the same class of compounds as structure IX and they can be represented by a single formula as follows:

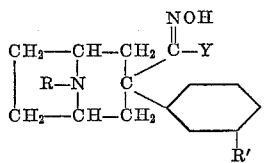

XIX wherein R' represents hydrogen or a lower-alkoxy radical, Y represents a lower-alkyl or a 3-R'-phenyl radical, and R has the same meaning as given above.

The oxime XVI is then subjected to the Beckmann rearrangement by heating it with hydrochloric and acetic acid at about 100° C., analogously to the conversion of IX to X, and the structure X is again produced.

The ketones of Formulas VIII and XV, wherein R represents hydrogen or the methyl radical, when in the form of their acid-addition salts exist largely in the tautomeric carbinolamine form, viz.:

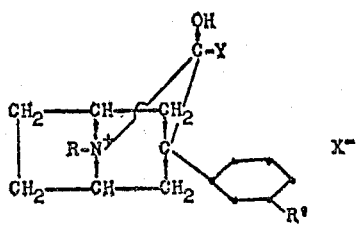

The foregoing structure was established from consideration of the infrared spectra of said ketones. In the case of compounds wherein R is hydrogen, the free bases can also exist in the carbinolamine form. Although the compounds of Formulas VIII and I are named and their structures depicted as ketones throughout this description, it is to be understood that the carbinolamine tautomeric forms are also contemplated as part of the invention.

The compounds of the invention of Formula I wherein R represents an organic radical can be prepared from the compounds wherein R represents hydrogen by reacting the latter with a halide, R—X, wherein X is halogen, in the presence of a basic condensing agent, or acid-acceptor, such as sodium carbonate, sodium methoxide, sodium amide, sodium hydride, or the like. This N-alkylation procedure can be effected at any stage in the synthesis, but preferably upon compounds I or V (R=H).

The compounds of the invention wherein R represents hydrogen can be prepared directly from nortropinone (II, R=H) according to the above flow-sheet. Alternatively, they can be prepared by reacting a compound wherein R is methyl with cyanogen bromide and then treating the resulting n-cyano compound with acid or base.

The compounds of Formulas I, VIII, X and XV wherein R' is a hydroxy radical are prepared by dealkylation of the corresponding compounds wherein R' is a lower-alkoxy radical. The dealkylation is carried out by heating the alkoxy compound with hydrogen bromide or hydrogen iodide in water or acetic acid solution, or with pyridine hydrochloride or hydrobromide at about 200° C. If a compound of Formula I where R' is hydroxy or acyloxy is desired, the dealkylation is preferably carried out on a compound of Formulas VIII, X or XV where R' is lower-alkoxy, and the resulting phenolic compound carried through the necessary subsequent steps to produce I (R' is OH). The compounds wherein R' is a carboxylic acyloxy radical are prepared by esterifying the compounds wherein R' is hydroxy by reacting the latter with the appropriate acid anhydride or acid halide.

The compounds of Formulas VI to X, inclusive, XII to XVI, inclusive, and I can exist in two stereochemical forms, depending upon the spatial arrangement of the groups at $C_3$ with respect to the remainder of the molecule. The sequence of steps shown in the first flow-sheet leads to compounds which will be designated the "β-series." The other stereochemical series, to be designated the "α-series" can be reached by treating the glycol VI with acetic anhydride in the absence of zinc chloride which leads to the epoxide VII of the α-series. The epoxide VII of the α-series can then be carried through the same series of reactions to produce the compounds VIII, IX, X and I of the α-series.

The novel compounds disclosed herein are useful in the free base form or in the form of acid-addition or quaternary ammonium salts, said salts also being within the purview of the invention. The preferred type of salts are pharmacodynamically acceptable salts, that is, salts whose anions are relatively innocuous to an animal organism in pharmacodynamic doses of the salts, so that the beneficial physiological properties inherent in the free base are not vitiated by side-effects ascribable to the anions. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of esters having a molecular weight less than about 200 to the free base form of the compounds. A preferred class of esters comprises alkyl, alkenyl or aralkyl esters of inorganic acids or organic sulfonic acids, and includes such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent. Heating can be used to facilitate the reaction, although salt formation usually takes place readily at room temperature. The quaternary ammonium salt separates directly or can be obtained by concentration of the solution.

Although pharmacodynamically acceptable salts are preferred, all acid-addition salts are within the scope of our invention. All acid-addition salts are useful as sources of the free base form even if the particular salt per se is not desired as the final product, as for example when the salt is formed for purposes of purification or identification or when it is used as an intermediate in preparing a pharmacodynamically acceptable salt by ion exchange procedures. All crystalline salts are also useful as characterizing derivatives of the free bases.

The molecular structures of the novel compounds herein disclosed are established by their mode of synthesis and corroborated by the correspondence of calculated and found values for the elementary analyses for representative examples. The structures are further confirmed by ultraviolet and infrared spectral data proving the presence of the various functional groups.

The compounds of our invention having the general Formula I possess valuable pharmacodynamic properties, in particular, analgesic activity. For example, when tested intraperitoneally in rats by the Bass-Van der Brook modification of the D'Amour-Smith method, 3-phenyl-3-carbethoxytropane hyrochloride [I; R is $CH_3$, R' is H, R'' is $C_2H_5$, $\beta$-series], was found to be approximately two and one-quarter times as active as meperidine hydrochloride as an analgesic. The former compound has an intravenous toxicity ($LD_{50}$) in rats of $12.6 \pm 1.6$ mg./kg. of body weight, and is very well tolerated by adult rhesus monkeys when administered intramuscularly in doses of 12 and 18 mg./kg. No depression of the respiratory rate or convulsions were observed in monkeys following administration of 3-phenyl-3-carbethoxytropane hydrochloride at doses as high as 18 mg./kg., whereas meperidine hydrochloride caused slight to moderate respiratory depression of one to three hours duration in monkeys when administered intramuscularly in single, daily doses of 6.4 and 12.8 mg./kg.

The compounds of Formula I can be prepared for use by formulation in the same manner as meperidine, e.g., in aqueous or aqueous-ethanol menstruum, or in solid form, e.g., tablet or powder. The tablet formulation can be prepared using conventional excipients, and the powder can be compounded in capsule form. These preparations can be administered orally or, in the case of aqueous preparations, intramuscularly, intraperitoneally or intravenously.

The intermediates of Formulas VI-X and related compounds of Formula XI also possess pharmacological utility, for example anticholinergic or ganglionic blocking activity, and they can be prepared for use in the same manner as atropine or hexamethonium, e.g., as isotonic aqueous solutions for subcutaneous or intramuscular injection, or as tablets for oral administration.

The following examples will further illustrate the invention without being limited thereby.

EXAMPLE 1

*3-(Diphenylhydroxymethyl)Pseudotropine Hydrochloride*
[VI; R is $CH_3$, R' is H]

A solution of 100 g. of $\alpha$-ecgonine methyl ester [V; R is $CH_3$] in 325 ml. of tetrahydrofuran was added during a period of twenty minutes to a stirred solution of phenyllithium (prepared from 316 g. of bromobenzene and 27.9 g. of lithium wire) in one liter of ether. Vigorous reflux accompanied the addition and stopped abruptly when the addition was complete. The reaction mixture was stirred and refluxed for one hour, then cooled and treated with 300 ml. of water. The solid material which precipitated was removed by filtration and washed with ether. The dark red filtrates were decolorized with activated charcoal, dried over anhydrous sodium sulfate, and the resulting solution was treated directly with an excess of alcoholic hydrogen chloride which caused separation of a nearly colorless crystalline powder. The latter was collected and dried at 60° C. in a vacuum oven for fifteen hours, giving 167 g. of 3-(diphenylhydroxymethyl)pseudotropine hydrochloride, M.P. 279.5–280.5° C. (decomposition) (corrected) after two recrystallizations from a methanol-ether mixture.

*Analysis.*—Calcd. for $C_{21}H_{25}NO_2 \cdot HCl$: C, 70.08; H, 7.28; Cl, 9.85. Found: C, 69.99; H, 7.39; Cl, 9.74.

A sample of the hydrochloride was treated with aqueous sodium carbonate, and the resulting free base was collected and recrystallized three times from hexane, giving 3-(diphenylhydroxymethyl)pseudotropine, M.P. 116–117° C. (uncorr.).

*Analysis.*—Calcd. for $C_{21}H_{25}NO_2$: C, 77.99; H, 7.79; N, 4.33. Found: C, 77.93; H, 7.85; N, 4.29.

EXAMPLE 2

*3-Benzhydrylidenetropane Epoxide*
[VII; R is $CH_3$, R' is H, $\beta$-series]

Fused, powdered zinc chloride (10 g.) was added all at once to a stirred suspension of 10 g. of 3-(diphenylhydroxymethyl)pseudotropine hydrochloride (Example 1) in 25 ml. of acetic anhydride at room temperature. Within fifty minutes the reaction mixture became homogeneous. After stirring for eighty minutes the dark brown solution was poured into a solution of 25 g. of sodium hydroxide in 200 ml. of water. The tan colored solid which separated was collected, dried and extracted with 250 ml. of boiling hexane. Upon evaporation of the extract to a volume of 100 ml. and cooling there separated 4.7 g. of crystalline powder, M.P. 155–166° C. Concentration of the filtrate gave an additional 1.0 g., M.P. 150–161° C. The crops were combined and recrystallized from 30 ml. of boiling methanol to give 4.3 g. of 3-benzhydrylidenetropane epoxide in the form of colorless plates, M.P. 166–166.5° C. (uncorr.).

*Analysis.*—Calcd. for $C_{21}H_{23}NO$: C, 82.55; H, 7.59; N, 4.59. Found: C, 82.32; H, 7.65; N, 4.04.

The hydrochloride salt of 3-benzhydrylidenetropane epoxide was prepared by addition of an excess of alcoholic hydrogen chloride to an ethereal solution of the free base. The hydrochloride salt had the M.P. 276–277° C. (dec.) (corr.) when recrystallized from a methanol-ether mixture.

*Analysis.*—Calcd. for $C_{21}H_{23}NO \cdot HCl$: C, 73.77; H, 7.07; N, 4.10. Found: C, 73.48; H, 6.74; N, 4.04.

Neither 3-benzhydrylidenetropane epoxide in carbon tetrachloride solution or its hydrochloride in a potassium bromide pellet exhibited carbonyl or hydroxyl type absorption in the infrared spectrum. The ultraviolet spectrum of the free base showed an extinction coefficient of 13,400 and a maximum at 220 m$\mu$ plus weak absorption peaks at 250–260 m$\mu$.

EXAMPLE 3

*3-Phenyl-3-Benzoyltropane*
[VIII; R is $CH_3$, R' is H, $\beta$-series]

(a) *Method 1 [from 3-(diphenylhydroxymethyl)pseudotropine].*—Fused, powdered zinc chloride (98 g.) was added all at once to a stirred suspension of 98 g. of 3-(diphenylhydroxymethyl)pseudotropine hydrochloride (Example 1) in 250 ml. of acetic anhydride. The reaction vessel was cooled in an ice-water bath since the initial reaction was mildly exothermic. After stirring for one hour, the clear, dark brown solution was left at room temperature for sixty-three hours and then poured into a solution of 250 g. of sodium hydroxide in two liters of water with cooling. The solid material which separated was collected and extracted once with one liter of methylene dichloride. The filtrate was extracted three times with 200 ml. portions of methylene dichloride. The methylene dichloride extracts were dried and concentrated, and the residual oil crystallized from 600 ml. of hexane. The 48.5 g. of 3-phenyl-3-benzoyltropane thus obtained had the M.P. 121–122.5° C. (uncorr.) when recrystallized from 700 ml. of hexane.

*Analysis.*—Calcd. for $C_{21}H_{23}NO$: C, 82.55; H, 7.59; N, 4.59. Found: C, 82.87; H, 7.43; N, 4.57.

The hydrochloride salt of 3-phenyl-3-benzoyltropane was obtained by treating an ether solution of a sample of the free base with an excess of alcoholic hydrogen chloride. The hydrochloride had the M.P. 249–251° C. (corr.) when recrystallized from absolute ethanol.

*Analysis.*—Calcd. for $C_{21}H_{23}NO \cdot HCl$: C, 73.77; H, 7.07; Cl, 10.37. Found: C, 73.50; H, 6.98; Cl, 10.13.

The methiodide salt of 3-phenyl-3-benzoyltropane was prepared by treating an acetone solution of the free base with an excess of methyl iodide. The methiodide salt separated directly from solution and had the M.P. 233.5–237.5° C. (corr.)

*Analysis.*—Calcd. for $C_{22}H_{26}INO$: C, 59.06; H, 5.87; I, 28.37. Found: C, 59.17; H, 5.60; I, 28.19.

The methiodide salt of 3-phenyl-3-benzoyltropane was found to have an anticholinergic activity 6.8% that of atropine sulfate. Its intravenous toxicity in mice ($ALD_{50}$) was 9 mg./kg. of body weight.

(b) *Method 2 [from 3-benzhydrylidenetropane epoxide].*—A mixture of 3-benzhydrylidenetropane epoxide hydrochloride (Example 2, prepared from 2.0 g. of the free base), 2 g. of fused, powdered zinc chloride and 5 ml. of acetic anhydride was stirred at room temperature for fifty-four hours. The reaction mixture was worked up according to the procedure described above in Method 1, giving 1.1 g. of 3-phenyl-3-benzoyltropane which upon recrystallization from hexane melted at 121.5–122° C., undepressed upon admixture with the product obtained above by Method 1.

EXAMPLE 4

(a) *Nor-α-Ecgonine Methyl Ester* [V; R is H].

A saturated, aqueous solution of 243 g. of nortropinone hydrochloride was added rapidly with stirring to a cold, saturated, aqueous solution of 107 g. of potassium cyanide while maintaining the temperature below 25° C. The thick, white slurry of cyanohydrin [III; R is H] was stirred for one hour at room temperature, collected by filtration, pressed as dry as possible and then added immediately to two liters of concentrated hydrochloric acid with stirring and cooling to keep the temperature below 25° C. The reaction mixture was stirred at room temperature for fifteen hours and then concentrated under vacuum. The residue was dried by adding benzene and distilling off the benzene, and finally by heating the residue at 100° C. and 3 mm. pressure. Esterification of the resulting 3-hydroxy-3-carboxynortropane [IV; R is H] was accomplished by refluxing it with 2.5 liters of methanol for twenty hours, during the first five hours of which period a rapid stream of dry hydrogen chloride was passed into the boiling solution. The reaction mixture was evaporated under vacuum, the solid residue dissolved in 550 ml. of water, the solution filtered and the filtrate treated with 400 g. of solid potassium carbonate with cooling. The solid material which separated was extracted twice with a total volume of 1.5 liters of boiling chloroform. The extracts were dried and concentrated, giving 135 g. of nor-α-ecgonine methyl ester, M.P. 142–146° C. (uncorr.). Additional ester was isolated by further addition of potassium carbonate to the aqueous phase; 28 g., M.P. 137–144° C. (uncorr.). A sample when recrystallized from ethyl acetate had the M.P. 144–147° C. (corr.).

*Analysis.*—Calcd. for $C_9H_{15}NO_3$: C, 58.36; H, 8.16; N, 7.56. Found: C, 58.28; H, 8.14; N, 7.60.

(b) *3-(Diphenylhydroxymethyl)Norpseudotropine Hydrochloride* [VI; R and R' are H].

A solution of 100 g. of nor-α-ecgonine methyl ester, prepared as described in part (a) above, in 1.5 liters of tetrahydrofuran was added to a stirred solution of phenyllithium (prepared from 594 g. of bromobenzene and 52.5 g. of lithium wire) in 1.5 liters of ether under a nitrogen atmosphere during a period of thirty minutes. The mixture was stirred and refluxed for three hours and then stirred at room temperature overnight. Following the same work-up procedure as that described in Example 1 there was obtained 157 g. of 3-(diphenylhydroxymethyl)norpseudotropine hydrochloride, which upon recrystallization from n-propyl alcohol had the M.P. 259.5° C. (dec.) (corr.). The product was found to contain n-propyl alcohol of crystallization.

*Analysis.*—Calcd. for $C_{20}H_{23}NO_2 \cdot HCl \cdot \frac{1}{3}C_3H_8O$: C, 68.93; H, 7.34; Cl, 9.69; $C_3H_7O$, 5.38. Found: C, 69.24, 68.93; H, 7.84, 7.53; Cl, 9.69; $C_3H_7O$, 5.38.

EXAMPLE 5

*8-(2-Phenylethyl)Nor-α-Ecgonine Methyl Ester Hydrochloride* [V; R is $C_6H_5CH_2CH_2$, lower-alkyl is $CH_3$].

A solution of 1.7 g. of nor-α-ecgonine methyl ester (Example 4), 1.9 g. of 2-phenylethyl bromide and 2.0 g. of potassium acetate was refluxed for four and one-half hours. The solvent was evaporated under vacuum and the residue heated at 100° C. and 0.3 mm. to remove last traces of solvent. The residue was stirred with water and extracted with ether. The ether extracts were dried and concentrated and the product converted to the hydrochloride salt, giving 1.6 g. of 8-(2-phenylethyl)nor-α-ecgonine methyl ester hydrochloride, M.P. 223–229° C. (dec.) (corr.) when recrystallized from an ethanol-ether mixture.

*Analysis.*—Calcd. for $C_{17}H_{23}NO_3 \cdot HCl$: C, 62.66; H, 7.42; Cl, 10.88. Found: C, 62.40; H, 7.30; Cl, 10.80.

EXAMPLE 6

8 - propargylnor - α - ecgonine methyl ester [V; R is $CH{\equiv}CCH_2$] can be prepared by replacement of the 2-phenylethyl bromide in Example 5 by a molar equivalent amount of propargyl bromide.

EXAMPLE 7

8-[2-(p-aminophenyl)ethyl]nor-α-ecgonine methyl ester [V; R is $p\text{-}H_2NC_6H_4CH_2CH_2$] can be prepared by replacement of the 2-phenylethyl bromide in Example 5 by a molar equivalent amount of 2-(p-aminophenyl)ethyl chloride.

EXAMPLE 8

8-benzylnor-α-ecgonine methyl ester [V; R is $C_6H_5CH_2$] can be prepared by replacement of the 2-phenylethyl bromide in Example 5 by a molar equivalent amount of benzyl bromide.

EXAMPLE 9

8-(3-phenylpropyl)nor-α-ecgonine methyl ester [V; R is $C_6H_5CH_2CH_2CH_2$] can be prepared by replacement of the 2-phenylethyl bromide in Example 5 by a molar equivalent amount of 3-phenylpropyl chloride.

EXAMPLE 10

8 - [2-(p-methoxyphenyl)ethyl]nor-α-ecgonine methyl ester [V; R is $p\text{-}CH_3OC_6H_4CH_2CH_2$] can be prepared by replacement of the 2-phenylethyl bromide in Example 5 by a molar equivalent amount of 2-(p-methoxyphenyl)ethyl chloride.

EXAMPLE 11

8-[2-(p-chlorophenyl)ethyl]nor-α-ecgonine methyl ester [V; R is $p\text{-}ClC_6H_4CH_2CH_2$] can be prepared by replacement of the 2-phenylethyl bromide in Example 5 by a molar equivalent amount of 2-(p-chlorophenyl)ethyl chloride.

EXAMPLE 12

*8-(2 - Phenylethyl)-3-(Diphenylhydroxymethyl)Norpseudotropine Hydrochloride* [VI; R is $C_6H_5CH_2CH_2$, R' is H]

A solution of 37 g. of β-(2-phenylethyl)nor-α-ecgonine methyl ester (Example 5 in 500 ml. of ether was added to a stirred solution of phenyllithium (prepared from 157 g. of bromobenzene and 13.9 g. of lithium wire) in 1 liter of ether over a period of fifteen minutes. The mixture was stirred and refluxed for four hours and then stirred overnight at room temperature. The reaction mixture was worked up according to the manipulative procedure described above in Example 1, giving 40.5 g. of 8-(2-phenylethyl)-3-(diphenylhydroxymethyl)norpseudotropine hydrochloride, M.P. 271.5–274° C. (dec.)(coor.) after recrystallization from methanol-ether.

*Analysis.*—Calcd. for $C_{28}H_{31}NO_2 \cdot HCl$: C, 74.73; H, 7.17; Cl, 7.89. Found: C, 74.48; H, 7.18; Cl, 7.67.

EXAMPLE 13

8-propargyl - 3 - (diphenylhydroxymethyl)norpseudotropine [VI; R is $CH \equiv CCH_2$, R' is H] can be prepared by replacement of the 8-(2-phenylethyl)nor-α-ecgonine methyl ester in Example 12 by a molar equivalent amount of 8-propargylnor-α-ecgonine methyl ester.

EXAMPLE 14

8-[2-(p-aminophenyl)ethyl] - 3 - (diphenylhydroxymethyl)norpseudotropine [VI; R is p-$H_2NC_6H_4CH_2CH_2$, R' is H] can be prepared by replacement of the 8-(2-phenylethyl)nor-α-ecgonine methyl ester in Example 12 by a molar equivalent amount of 8-[2-(p-aminophenyl)ethyl]nor-α-ecgonine methyl ester.

EXAMPLE 15

8-benzyl - 3 - (diphenylhydroxymethyl)norpseudotropine [VI; R is $C_6H_5CH_2$, R' is H] can be prepared by replacement of the 8-(2-phenylethyl)nor-α-ecgonine methyl ester in Example 12 by a molar equivalent amount of 8-benzylnor-α-ecgonine methyl ester.

EXAMPLE 16

8-(3-phenylpropyl) - 3 - (diphenylhydroxymethyl)norpseudotropine [VI; R is $C_6H_5CH_2CH_2CH_2$, R' is H] can be prepared by replacement of the 8-(2-phenylethyl)nor-α-ecgonine methyl ester in Example 12 by a molar equivalent amount of 8-(3-phenylpropyl)nor-α-ecgonine methyl ester.

EXAMPLE 17

8-[2-(p-methoxyphenyl)ethyl] - 3 - (diphenylhydroxymethyl)norpseudotropine [VI; R is p-$CH_3OC_6H_4CH_2CH_2$, R' is H] can be prepared by replacement of the 8-(2-phenylethyl)nor-α-ecgonine methyl ester in Example 12 by a molar equivalent amount of 8-[2-(p-methoxyphenyl)ethyl]nor-α-ecgonine methyl ester.

EXAMPLE 18

8-[2-(p-chlorophenyl)ethyl] - 3 - (diphenylhydroxymethyl)norpseudotropine [VI; R is p-$ClC_6H_4CH_2CH_2$, R' is H] can be prepared by replacement of the 8-(2-phenylethyl)nor-α-ecgonine methyl ester in Example 12 by a molar equivalent amount of 8-[2-(p-chlorophenyl)ethyl]nor-α-ecgonine methyl ester.

EXAMPLE 19

*8-(2-Phenylethyl)-3-Phenyl-3-Benzoylnortropane*
[VIII; R is $C_6H_5CH_2CH_2$, R' is H]

A stirred suspension of 35.5 g. of 8-(2-phenylethyl)-3-(diphenylhydroxymethyl)norpseudotropine hydrochloride (Example 12) in 250 ml. of acetic anhydride was treated all at once with 35.5 g. of fused, powdered zinc chloride, and the mixture was stirred at room temperature for twenty hours. The reaction mixture was worked up according to the manipulative procedure described above in Example 3, giving 28.0 g. of 8-(2-phenylethyl)-3-phenyl-3-benzoylnortropane in the form of an oil, which after crystallization and recrystallization from hexane was obtained in the form of colorless needles, M.P. 112–114° C. (uncorr.).

*Analysis.*—Calcd. for $C_{28}H_{29}NO$: N, 3.54. Found: N, 3.53.

The hydrochloride salt of 8-(2-phenylethyl)-3-phenyl-3-benzoylnortropane was prepared in the usual manner by treatment of an ethereal solution of the free base with an excess of ethanolic hydrogen chloride. The hydrochloride had the M.P. 266–267° C. (dec.)(uncorr.) when recrystallized from absolute ethanol.

*Analysis.*—Calcd. for $C_{28}H_{29}NO \cdot HCl$: C, 77.85; H, 7.00; Cl, 8.21. Found: C, 77.80; H, 6.68; Cl, 8.13.

EXAMPLE 20

8-propargyl-3-phenyl-3-benzoylnortropane [VIII; R is $CH \equiv CCH_2$, R' is H] can be prepared by replacement of the 8 - (2-phenylethyl)-3-(diphenylhydroxymethyl)norpseudotropine hydrochloride in Example 19 by a molar equivalent amount of 8-propargyl-3-(diphenylhydroxymethyl)norpseudotropine.

EXAMPLE 21

8-[2-(p-aminophenyl)ethyl]-3-phenyl - 3 - benzoylnortropane [VIII; R is p-$H_2NC_6H_4CH_2CH_2$, R' is H] can be prepared by replacement of the 8-(2-phenylethyl)-3-(diphenylhydroxymethyl)norpseudotropine hydrochloride in Example 19 by a molar equivalent amount of 8-[2-(p-aminophenyl)ethyl] - 3 - (diphenylhydroxymethyl)norpseudotropine.

EXAMPLE 22

8-benzyl-3-phenyl-3-benzoylnortropane [VIII; R is $C_6H_5CH_2$, R' is H] can be prepared by replacement of the 8-(2-phenylethyl) - 3 - (diphenylhydroxymethyl)norpseudotropine hydrochloride in Example 19 by a molar equivalent amount of 8-benzyl-3-(diphenylhydroxymethyl)norpseudotropine.

EXAMPLE 23

8-(3-phenylpropyl)-3-phenyl - 3 - benzoylnortropane [VIII; R is $C_6H_5CH_2CH_2CH_2$, R' is H] can be prepared by replacement of the 8-(2-phenylethyl)-3-(diphenylhydroxymethyl)norpseudotropine hydrochloride in Example 19 by a molar equivalent amount of 8-(3-phenylpropyl)-3-(diphenylhydroxymethyl)norpseudotropine.

EXAMPLE 24

8-[2-(p-methoxyphenyl)ethyl]-3-phenyl - 3 - benzoylnortropane [VIII; R is p-$CH_3OC_6H_4CH_2CH_2$, R' is H] can be prepared by replacement of the 8-(2-phenylethyl)-3-(diphenylhydroxymethyl)norpseudotropine hydrochloride in Example 19 by a molar equivalent amount of 8-[2-(p-methoxyphenyl)ethyl] - 3 - (diphenylhydroxymethyl)norpseudotropine.

EXAMPLE 25

8-[2-(p-chlorophenyl)ethyl]-3-phenyl - 3 - benzoylnortropane [VIII; R is p-$ClC_6H_4CH_2CH_2$, R' is H] can be prepared by replacement of the 8-(2-phenylethyl)-3-(diphenylhydroxymethyl)norpseudotropine hydrochloride in Example 19 by a molar equivalent amount of 8-[2-(p-chlorophenyl)ethyl] - 3 - (diphenylhydroxymethyl)norpseudotropine.

EXAMPLE 26

*3-Phenyl-3-(Phenylhydroxymethyl)Tropane*
[XI; R is $CH_3$, R' is H]

(*a*) *By lithium aluminum hydride reduction of 3-phenyl-3-benzoyltropane.*—To a warm, stirred suspension of 0.5 g. of lithium aluminum hydride in 75 ml. of ether was added all at once 2.0 g. of 3-phenyl-3-benzoyltropane (Example 3) in 100 ml. of ether, and the mixture was refluxed for six hours. The mixture was cooled, and the excess lithium aluminum hydride was decomposed by dropwise addition of 1 ml. of water followed by 1 ml. of 35% sodium hydroxide solution. The solid material which had formed was collected by filtration and extracted once with boiling chloroform. The chloroform extracts were dried and concentrated, giving 2.1 g. of 3-phenyl-3-(phenylhydroxymethyl)tropane, M.P. 160–161° C. (corr.) when recrystallized from carbon tetrachloride.

*Analysis.*—Calcd. for $C_{21}H_{25}NO$: C, 82.01; H, 8.20; N, 4.56. Found: C, 82.36; H, 8.55; N, 4.52.

The methiodide salt of 3-phenyl-3-(phenylphydroxymethyl)-tropane was prepared by treatment of an acetonitrile solution of the free base with an excess of methyl iodide. The methiodide had the M.P. 280–282.5° C. (corr.).

*Analysis.*—Calcd. for $C_{22}H_{28}NOI$: C, 58.80; H, 6.28; I, 28.24. Found: C, 58.85; H, 6.01; I, 28.10.

The methiodide of 3-phenyl-3-(phenylhydroxymethyl)-tropane was found to have an anticholinergic activity 3.8% that of atropine sulfate. Its intravenous toxicity in mice ($ALD_{50}$) was 8.0 mg./kg. of body weight.

(*b*) *By catalytic hydrogenation of 3-phenyl-3-benzoyltropane.*—A solution of 8.8 g. of 3-phenyl-3-benzoyltropane in 225 ml. of ethanol was shaken with 0.6 g. of platinum oxide catalyst and hydrogen at room temperature until one equivalent of hydrogen was taken up. The catalyst was removed by filtration, the filtrate evaporated to dryness and the residue recrystallized from acetone, giving 6.5 g. of 3-phenyl-3-(phenylhydroxymethyl)tropane.

This application is a division of our copending application, Serial No. 731,857, filed April 30, 1958, now U.S. Patent 3,120,537, issued February 4, 1964.

We claim:
1. A compound selected from the group consisting (A) 3-(monocarbocyclic aryl)-3-(monocarbocyclic arylhydroxymethyl)tropanes of the formula

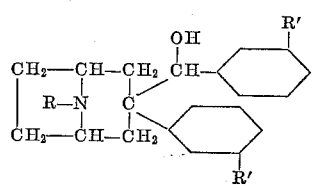

wherein R is a member of the group consisting of hydrogen, lower-aliphatic hydrocarbon, monocarbocyclic aryl-lower-aliphatic hydrocarbon, and monocarbocyclic arylamino-lower-aliphatic hydrocarbon, the monocarbocyclic aryl in each instance being selected from the group consisting of phenyl and phenyl substituted by from one to three substituents selected from the group consisting of hydroxy, fluoro, chloro, bromo, iodo, nitro, amino, lower-alkoxy and lower-alkylamino; and R' is a member of the group consisting of hydrogen and lower-alkoxy; (B) acid-addition salts thereof; and (C) lower-alkyl, lower-alkenyl and monocarbocyclic aryl-lower-alkyl quaternary ammonium salts thereof.

2. 3-phenyl-3-(phenylhydroxymethyl)tropane.

3. A lower-alkohalide quaternary ammonium salt of 3-phenyl-3-(phenylhydroxymethyl)tropane.

4. 3-phenyl-3-(phenylhydroxymethyl)tropane methiodide.

References Cited in the file of this patent

Gaylord: "Reduction With Complex Metal Hydrides" (Interscience), p. 124 (1956).